Patented Aug. 11, 1942

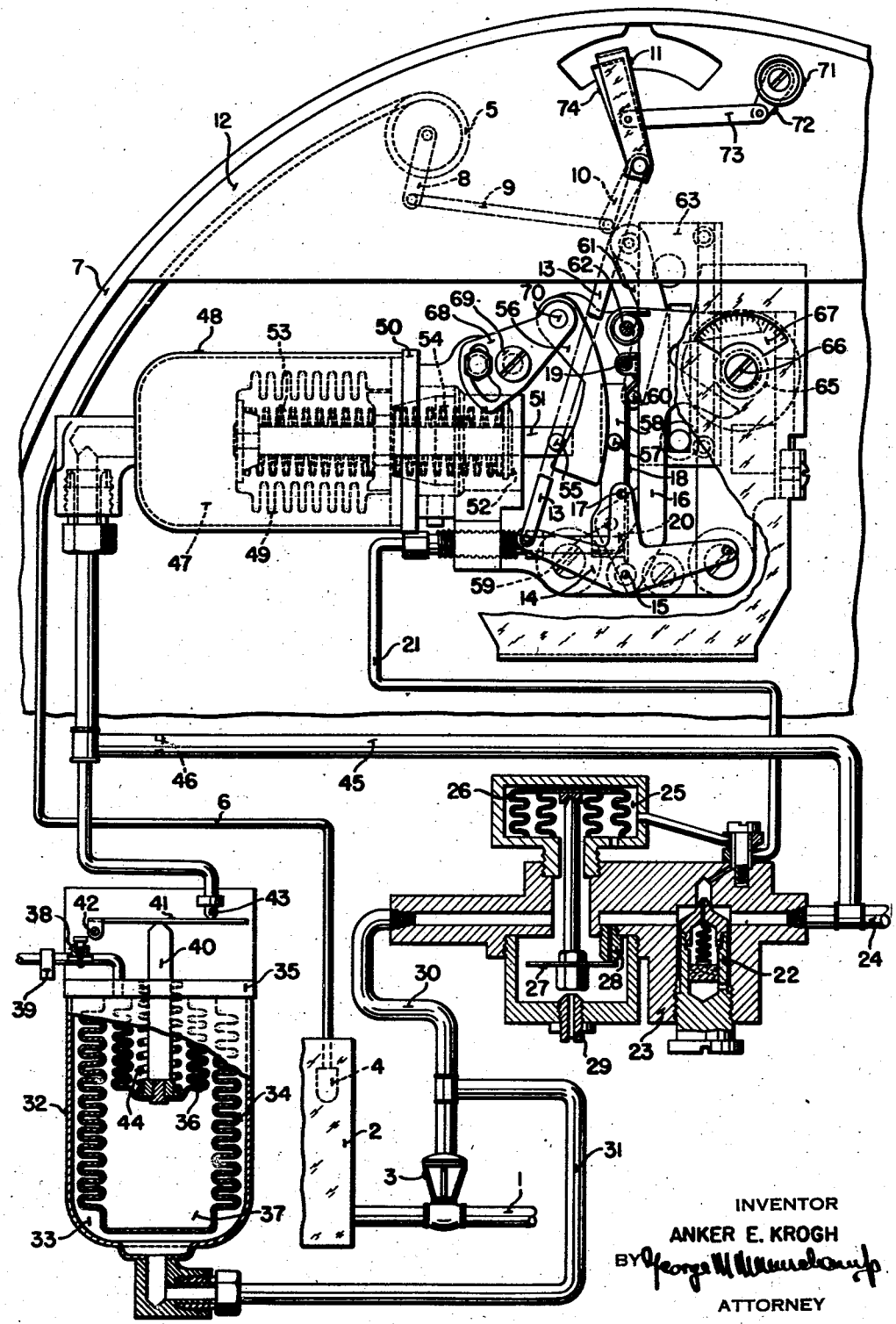

2,292,761

UNITED STATES PATENT OFFICE 2,292,761

AIR CONTROL INSTRUMENT

Anker E. Krogh, Mount Airy, Pa., assignor to The Brown Instrument Company, Philadelphia, Pa., a corporation of Pennsylvania Application September 15, 1939, Serial No. 295,087

3 Claims. (Cl. 236—82)

My present invention comprises improvements in fluid pressure control apparatus operating to create a control fluid pressure force which is impressed on a fluid pressure control motor or analogous control actuating element and which varies in accordance with changes in a control condition such, for example, as a temperature, a pressure, a height of liquid level, or a velocity, the controlling condition usually, though not necessarily, being returned to, or toward a normal value on a departure therefrom, by the operation of said motor or analogous device.

A main object of the present invention is to provide certain specific improvements in fluid pressure controlling apparatus of the type comprising means whereby a departure in the value of a controlling condition from a predetermined or normal value thereof, varies an air or other elastic fluid pressure control force, and whereby such initial variation in the control force produces a second control force adjustment quickly eliminating more or less of the initial change in the control pressure, and produces a subsequent third control force adjustment by which the effect of the second adjustment is neutralized at a rate suitably retarded to insure the regulation or control stability necessary to avoid hunting. Said second or third adjustments are sometimes referred to as "follow-up" and "compensating" adjustments, respectively, and the third adjustment is also sometimes referred to as an automatic resetting adjustment.

In such control apparatus, the extent to which the initial control pressure adjustment is neutralized by the second adjustment, and the rate at which the third adjustment neutralizes the effect of the second adjustment, should be capable of regulation or calibration to enable the apparatus to give desirable results under varying conditions of operation. In particular, such calibration should be effected with regard to, or in accordance with the maximum magnitude of corrective control actions which the particular process or operation controlled can absorb without being unduly disturbed or upset. Such calibration should also be effected with suitable regard to the time constants or lag of the particular process or operation controlled.

Another main object of the invention is to provide an instrument in which the fluid under pressure that is used to provide the second and third adjusting movements is capable of exerting a comparatively large force in order to accomplish those adjustments. It is a further object of the invention to provide an instrument in which movements of the parts which produce the various adjustments are relatively large, which permits large variations in valve pressure in response to small variations in the controlling pressure.

It is a further object of the invention to provide a control instrument that is extremely flexible in producing the control functions of which it is capable. This flexibility permits the instrument to be used in a large number of control applications with a minimum of adjustment.

The various features of novelty which characterize the present invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

In the drawing there is shown, by way of example, a supply pipe 1 through which a temperature controlling fluid flows to a furnace 2 past a valve 3 which varies the flow of fluid. The valve 3 may conveniently be of the air operated type in which air under pressure is supplied to a diaphragm to open the valve in opposition to a spring that normally tends to maintain the valve closed. The temperature in the furnace 2 is measured by a bulb 4 that contains some suitable temperature responsive medium which expands as the temperature increases to raise the pressure in a Bourdon tube element 5 that is connected to the bulb 4 by means of a capillary tube 6.

The Bourdon tube and the other mechanism, now to be described, are conveniently located in an instrument casing 7 which contains provisions for supporting a chart (not shown) upon which a record of the temperature variations of the furnace 2 may be made. Upon an increase in temperature in the furnace the Bourdon tube tends to unwind and then through suitable connections which may take the form of those shown in Patent 2,125,081 issued to C. B. Moore, and including a lever 8 pivoted at a point coaxial with the tube 5, link 9 and lever 10, gives a clockwise movement to a pen supporting arm 11 that extends through an opening of a plate 12 which is attached to the casing 7 and covers part of the mechanism. This same movement of the Bourdon tube 5 gives an upward or initial movement to a link 13, attached at its lower end to a pivoted flapper actuating member 14. This member 14 is pivoted at 15 on an arm 16, and is provided with a pin 17 that, upon clockwise movement, moves a flapper valve member 18, pivoted at 19, against its natural bias away from a nozzle 20.

The nozzle 20 is supplied with air under a suitable reduced pressure through a line 21 from a filter and restriction unit 22 located in a pilot or booster valve 23, that is in turn, supplied with air under a regulated pressure from a pipe 24. The pipe 21 is also connected to a chamber 25, one wall of which is formed of a bellows 26 that changes in size due to pressure changes in the chamber. A change in length of the bellows 26 shifts a valve member 27 up and down between an intake valve 28 and an exhaust valve 29 to regulate the supply of air from pipe 24, through the booster valve 23 to a pipe 30 that communicates with the diaphragm of valve 3.

The pressure in the line 30 that is applied to the valve 3 is also applied through a line 31 to a booster and control unit 32 which controls the second or follow-up adjustment of the instrument. Within the casing of the unit is a chamber 33 that is formed by an expansible bellows 34 that has some predetermined normal length and whose open end is attached to a head member 35. Also attached to the head 35 is a second bellows 36, that forms with the first an inter-bellows chamber 37 which is in restricted communication with the atmosphere through an adjustable orifice 38 and a small filter unit 39. Attached to the inner wall of bellows 36 is a rod 40 whose upper end engages a flapper valve member 41 pivoted at 42 to control the position of the flapper with respect to a nozzle 43. The bellows 36 may be biased toward a predetermined normal length by a spring 44.

The nozzle 43 is supplied with air under a constant pressure from the supply line 24 through a line 45 containing a restriction 46. The nozzle 43 is also in communication with a chamber 47 in a follow-up unit 48. One wall of the chamber 47 is formed of a bellows 49 whose open end is attached to a head member 50. Fastened to the closed end of the bellows and extending through the head 50 is a rod 51 that is provided with a collar 52. In order to maintain the bellows 49 at some predetermined length two springs 53 and 54 are provided, each having one end abutting the head 50, the former having its other end engaging the head of bellows 49 while the latter has its other end engaging the collar 52.

Changes in pressure in the chamber 47 change the length of bellows 49 to shift rod 51 and produce the follow-up or second adjusting movement of the flapper 18. This is accomplished through a lever system by means of a pin 55 on the rod 51 engaging the side of a cam member 56 that in turn engages a pin 57 on a lever 58 pivoted at 59. Movement of lever 58 shifts a pin 60, on a lever 61, to move the arm 16 around its pivot 62 to move flapper adjusting lever 14.

The amount of follow-up produced for a given pressure change in the chamber 47 may be varied by changing the "throttling range," of the instrument. The term "throttling range" may be defined as the percentage of the total movement of the measuring instrument required to move the valve from its fully open to its fully closed position, and is altered by shifting the pin 60 relative to levers 58 and 16 to change the leverage between them. To do this the arm 61, upon which pin 60 is supported, is shifted up and down by moving a member 63 to which it is supported. For this purpose 63 is provided with a rack meshing with a pinion 65 that is turned by a shaft 66. A plate 67 which may conveniently be graduated in percent throttling range is also attached to the shaft.

The cam or thrust member 56 may be adjusted to change the relation between rod 51 and lever 16 by moving a supporting member 68 around 69 as a center. The thrust member 56 being pivoted to 68 at 70.

In the operation of the instrument a decrease in the temperature in furnace 2 will cause an opening movement of the valve 3 to increase the flow of heating fluid through pipe 1. This is accomplished in the following manner. Upon a decrease in the temperature of the furnace the Bourdon tube 5 will contract to move lever 8 and the pen supporting member 11 counterclockwise. This same movement lowers the link 13 so that pin 17, on lever 14, will be moved to the left, thus permitting the flapper 18 to move toward nozzle 20 and throttle the flow of air therethrough. Since less air is escaping through the nozzle 20, pressure in line 21 and chamber 25 will be increased to cause a contraction of the bellows 26 and move the valve 27 downwardly. This movement of the valve 27 opens the inlet port 28 and closes the outlet port 29 so that more air can be supplied to the booster valve 23 from line 24, and thereby increase the pressure in line 30 and on the diaphragm of valve 3 to open the valve.

The same increase in pressure supplied to the valve is applied through line 31 to the chamber 33 to produce an immediate contraction of bellows 34 and 36, the latter moving as required to maintain the volume of the inter-bellows space 37 constant, since this initial bellows movement is effected rapidly and in a period of time too short for a flow of a significant amount of air from the space 37 through the restriction 38, although said bellows contraction necessarily initiates such a flow due to the increased pressure on the air therein. As the bellows 36 contracts, the rod 40 is moved upwardly to move flapper 41 toward nozzle 43 to throttle the flow therethrough and increase the pressure in chamber 47. This increase of pressure contracts the bellows 49 and moves rod 51 to the right and operates through pin 55, lever 56, pin 57, lever 58 and pin 60 to move lever 16 to the right and thereby shift the lever 14, including its flapper engaging pin 17 to the right. The last mentioned movement of pin 17 moves the flapper 18 away from the nozzle 20, with the result of effecting the second or follow-up adjustment decrease in the pilot valve chamber 26 and the chambers 33, 37 and 47.

The extent to which the initial increase in the control pressure is thus neutralized by the follow-up adjustment depends both upon the extent of movement of rod 51 and the position of pin 60 along levers 58 and 16. Since the follow-up adjustment is initiated as soon as the pressure in chamber 47 begins to increase the follow-up adjustment may be contemporaneous in part with the initial adjustment of the flapper, but whether the initial adjustment is completed during or before the follow-up adjustment of the flapper 18, the ultimate effect of a decrease in the temperature of bulb 4 is a quickly effected adjustment of the flapper 18 to a position intermediate its original position and the position it would assume without the follow-up movement of lever 16.

As soon as the pressure in the inter-bellows space 37 is increased as a result of the pressure increase in chamber 33, air begins to flow from space 37 through the restriction 38 and filter 39 to the atmosphere. Ordinarily, as previously explained, that flow is too small to have any significant effect on the initial and follow-up adjustment. Eventually, however, assuming no further temperature change on bulb 4, enough air will flow from space 37 until its pressure is again equal to atmospheric and to permit the bellows 36 to expand to its normal length. The time required for this pressure equalization depends in part upon the initial pressure increase and in part upon the adjustment of the restriction 38.

As the bellows 36 slowly returns to its normal length the rod 40 is slowly lowered to its original position, permitting a reduction in pressure in chamber 47 to its original value. This in turn slowly effects a return movement of the lever 16 to its original position and gives the flapper 18 its third or compensating adjustment and neutralizes the effect of the follow-up adjustment on the flapper. The bellows 34 at the termination of the compensating action will be displaced from its initial position by an amount depending upon the amount of air that has escaped from chamber 37 during the interval that the temperature at bulb 4 was below normal. At this time assuming that the effect of the increased pressure in the chamber 33 has caused sufficient opening of the valve 3 that the temperature has returned toward its normal value, equilibrium of the apparatus with bellows 36 and 49 at their normal lengths may occur with a pressure in chamber 33 different from the pressure in the chamber at the commencement of the operations just described.

For steady operation with varying rates of heat output, it is theoretically necessary that the flapper 18 should occupy a different position for each different heat output rate. In consequence, if the furnace load during and at the end of the assumed operating cycle was more than it was just prior to the beginning of the cycle, the control pressure must be higher at the end of the cycle than it was immediately prior to the beginning of the cycle, and at the end of the cycle the temperature of the bulb 4 must be below its former and assumed normal value. In practice, however, with the control apparatus of the type illustrated which is properly designed and calibrated for the conditions of operation, the difference between the stable furnace temperatures obtained with different loads in any ordinary range of load variation, will be too slight to have measurable or other practical significance. Moreover, where the furnace loads have widely different average values during different periods, if of an appreciable duration, the theoretical tendency of the different average loads to result in different bulb temperatures, may be eliminated by suitable adjustments of the device as hereinafter described.

It hardly need be pointed out that in an operating cycle initiated by an increase in the temperature of the bulb 4, control actions are effected which are precisely analogous, though respectively opposite in direction, to the above described actions occurring in a cycle initiated by a decrease in the bulb temperature.

By the use of chamber 47 and bellows 49 to give the follow-up and compensating movements to the flapper 18 instead of causing those movements directly by the bellows 36 there is much more power available for those movements. This is due to the fact that the movement of the bellows 36 is produced by the compression or expansion of the air in inter-bellows space 37 whereas the movement of bellows 49 is directly responsive to the force produced by the change in the air pressure in chamber 47. A comparatively small amount of power is needed to control flapper 41 with respect to the amount that is needed to move flapper 18 through the throttling range adjusting lever system.

Another advantage that is obtained by the operation of the instrument of my invention is that the relatively large motion of the bellows 49, as compared to the motion of the bellows 36, permits a large motion of the flapper 18 in response to a given motion of the link 13, which is moved by the Bourdon tube 5, with an added flexibility of the instrument.

In order to change the initial relation of the link 13 and the Bourbon tube 5 so that the instrument may control the value of the temperature in furnace 2 at various values a linkage similar to that in the above mentioned patent, 2,125,081, may be used. For this purpose there is provided a knob 71 with a crank arm 72 and connected by a link 73 to an index member 74. The index 74 is adapted to overlie the chart to indicate the value at which the instrument is adapted to control the condition. This value may be changed by rotating the knob 71.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In an air control system adjusted in response to variations in the value of a controlled condition, a pilot valve operated by said air control system to adjust a pressure supply, means providing follow-up for said system in response to an adjustment thereof, control means for said follow-up means including a second and separate air control system, and means responsive to changes in the pressure supply controlled by the pilot valve to adjust said control means in one direction to give follow-up action, said control means acting independently thereof in the opposite direction to give reset action.

2. In combination with an air control instrument having follow-up provisions, a pilot valve mechanism adapted to adjust a pressure supply, means to regulate said pilot valve in accordance with the value of a control condition, a second fluid pressure supply to operate said follow-up provisions, a valve to adjust said second pressure supply, and an attachment operated by the pressure supply from the pilot valve to adjust said valve, said attachment comprising means operative in response to changes in the pressure supply from the pilot valve to move said valve controlling the second fluid pressure supply rapidly in one direction and slowly in the opposite direction.

3. In combination with an air control instrument, a first, a second and a third fluid pressure supply, means operative in response to variations in the value of a control condition to proportionately vary the value of said first pressure supply, a pilot valve operated in response to variations in said first pressure supply to proportionately vary said second pressure supply, means operated by the pressure supplied by the pilot valve to vary the third pressure supply rapidly in one direction and slowly in the opposite direction, and means operated by the adjusted third pressure supply to vary the first pressure supply independently of the first mentioned means.

ANKER E. KROGH.